(12) United States Patent
Kim et al.

(10) Patent No.: US 10,082,875 B1
(45) Date of Patent: Sep. 25, 2018

(54) VIBRATING APPARATUS, SYSTEM AND METHOD FOR GENERATING TACTILE STIMULATION

(71) Applicant: KOREA INSTITUTE OF SCIENCE AND TECHNOLOGY, Seoul (KR)

(72) Inventors: Jaeha Kim, Seoul (KR); Jaeyoung Park, Seoul (KR); Yonghwan Oh, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/687,152

(22) Filed: Aug. 25, 2017

(30) Foreign Application Priority Data

Jun. 5, 2017 (KR) ......................... 10-2017-0069617

(51) Int. Cl.
*G06F 3/01* (2006.01)

(52) U.S. Cl.
CPC .................................. *G06F 3/016* (2013.01)

(58) Field of Classification Search
CPC .......... G06F 3/016; G06F 3/018; G06F 3/023; G06F 3/05; G09B 21/00; G09B 21/003; G09B 21/004; G09B 21/005; G09B 21/006; G09B 21/007; G09B 21/008
See application file for complete search history.

(56) References Cited

U.S. PATENT DOCUMENTS

| | | | |
|---|---|---|---|
| 6,275,213 B1 | 8/2001 | Tremblay et al. | |
| 8,405,618 B2 * | 3/2013 | Colgate | G06F 3/016 |
| | | | 345/173 |
| 8,836,664 B2 * | 9/2014 | Colgate | G06F 3/016 |
| | | | 345/173 |
| 9,104,285 B2 * | 8/2015 | Colgate | G06F 3/016 |
| 9,804,724 B2 * | 10/2017 | Colgate | G06F 3/016 |
| 9,880,621 B2 * | 1/2018 | Israr | G06F 3/016 |
| 2007/0091063 A1 | 4/2007 | Nakamura et al. | |
| 2007/0236450 A1 * | 10/2007 | Colgate | G06F 3/016 |
| | | | 345/156 |

(Continued)

FOREIGN PATENT DOCUMENTS

| | | |
|---|---|---|
| JP | 2012-83866 A | 4/2012 |
| KR | 10-2010-006379 A | 6/2010 |

(Continued)

OTHER PUBLICATIONS

David J. Meyer et al., "Fingertip Friction Modulation due to Electrostatic Attraction", IEEE World Haptics Conference 2013, pp. 43-48.

(Continued)

*Primary Examiner* — Van Trieu
(74) *Attorney, Agent, or Firm* — Birch, Stewart, Kolasch & Birch, LLP

(57) ABSTRACT

An apparatus for generating tactile stimulation includes vibration actuators disposed on opposing sides of a finger, and a sensor configured to detect a position and a pointing direction of the finger, wherein the vibration actuators apply vibration to the finger with intensity and duration determined by the position and the pointing direction of the finger detected by the sensor, and wherein illusory stimulation is generated within the finger by the vibration generated by the vibration actuators.

10 Claims, 9 Drawing Sheets

(56) References Cited

U.S. PATENT DOCUMENTS

| | | | |
|---|---|---|---|
| 2009/0102805 A1* | 4/2009 | Meijer | G06F 3/016 345/173 |
| 2010/0245237 A1 | 9/2010 | Nakamura | |
| 2011/0080273 A1* | 4/2011 | Kawai | G06F 3/016 340/407.1 |
| 2011/0285666 A1 | 11/2011 | Poupyrev et al. | |
| 2012/0113008 A1* | 5/2012 | Makinen | G06F 3/016 345/168 |
| 2016/0357258 A1 | 12/2016 | Yeom et al. | |

FOREIGN PATENT DOCUMENTS

| | | |
|---|---|---|
| KR | 10-1169814 B1 | 7/2012 |
| KR | 10-1726388 B1 | 4/2017 |
| KR | 10-1731476 B1 | 5/2017 |

OTHER PUBLICATIONS

Laura Winfield et al., "T-PaD: Tactile Pattern Display through Variable Friction Reduction", Second Joint EuroHaptics Conference and Symposium on Haptic Interfaces for Virtual Environment and Teleoperator Systems, 2007, 6 pages.

Mélisande Biet et al., "Squeeze Film Effect for the Design of an Ultrasonic Tactile Plate", IEEE Transactions on Ultrasonics, Ferroelectrics, and Frequency Control, vol. 54, No. 12, Dec. 2007, pp. 2678-2688.

Olivier Bau et al., "TeslaTouch: Electrovibration for Touch Surfaces", Proceedings of the 23rd Annual ACM Symposium on User Interface Software and Technology, 2010, 10 pages.

\* cited by examiner

VIBRATING APPARATUS, SYSTEM AND METHOD FOR GENERATING TACTILE STIMULATION

CROSS-REFERENCE TO RELATED APPLICATION

This application claims priority to Korean Patent Application No. 10-2017-0069617, filed on Jun. 5, 2017, and all the benefits accruing therefrom under 35 U.S.C. § 119, the contents of which in its entirety are herein incorporated by reference.

BACKGROUND

1. Field

The present disclosure relates to an apparatus, system and method for generating tactile simulation, and more particularly, to an apparatus, system and method for generating tactile simulation that is worn on a user's body to stimulate the body through vibration.

2. Description of the Related Art

Haptic feedback technology is being intensively studied. Particularly, to provide realistic haptic feedback corresponding to visual information, many studies have been made on tactile interfaces that can be used on touch screens.

In some studies, to provide more realistic tactile stimulation, various attempts have been made to reflect geometry information such as the height of touch screens. Such attempts were impossible to render interaction forces between a touch screen and a user's body, but technology using so-called "two-and-a-half-dimensional (2.5D) geometry" for effective representation of 3D geometry on a plane surface was developed.

Referring to FIG. 1, conventional methods for generating tactile stimulation in 2.5D geometry include a method of applying forces in the lateral direction when interaction between a virtual model and a finger occurs, by use of an electrostatic display and the squeeze film effect as disclosed by US Patent Publication No. 20110285666.

The conventional method for generating tactile stimulation uses a touch screen with a structure in which an insulation film 206 and a conductive film 202 are stacked, to provide tactile feedback when a user touches the touch screen with a finger 208 and slides the finger.

An advantage of the conventional method for generating tactile stimulation is the use of a bare hand to touch and interact with the touch screen, but to detect the surface structure, a finger's touch on the touch screen is required and haptic properties are controlled throughout the entire touch screen, failing to impart individual effects to each finger.

In case that a touch occurs at a single point, the conventional method cannot provide tactile stimulation, and can provide tactile stimulation only in the presence of a relative motion, for example, drag or slide.

Furthermore, in case that touches occur simultaneously at multiple positions, the conventional method cannot provide different tactile stimulations to each contact point. Because the conventional method controls the entire touch screen to give tactile effects, it only gives the same effect even though the user touches two virtual objects of different materials with different fingers.

RELATED LITERATURES

Patent Literatures (Patent Literature 1) US Patent Publication No. 20110285666

SUMMARY

The present disclosure is designed to solve the problem of the method for generating tactile stimulation described above. The present disclosure is directed to providing an apparatus for generating tactile stimulation in which vibration actuators placed on opposing sides of a finger to generate vibration with vibration intensity and duration determined by a position and a pointing direction of the finger generates illusory stimulation within a user's finger to allow the user to feel stereoscopic tactile stimulation, a system for generating tactile stimulation comprising the same and a method for generating tactile stimulation using the same.

The object of the present disclosure is not limited to those mentioned above, and another object not mentioned herein will be clearly understood by those skilled in the art from the following description.

To achieve the object, an apparatus for generating tactile stimulation according to an embodiment of the present disclosure includes vibration actuators disposed on opposing sides of a finger, and a sensor configured to detect a position and a pointing direction of the finger, wherein the vibration actuators apply vibration to the finger with intensity and duration determined by the position and the pointing direction of the finger detected by the sensor, and illusory stimulation is generated within the finger by the vibration generated by the vibration actuators.

According to an embodiment of the present disclosure, multiple vibration actuators may be placed on each of two sides of the finger, and the vibration actuators placed on each side of the finger may be arranged along the pointing direction of the finger.

To achieve the object, a system for generating tactile stimulation according to another embodiment of the present disclosure includes the apparatus for generating tactile stimulation, and a control device configured to generate a virtual model in virtual space, determine intensity and duration of vibration based on geometry of the virtual model corresponding to a pointing direction and a position of a finger detected by the sensor, and operate the vibration actuators to generate vibration with the determined intensity and duration.

According to an embodiment of the present disclosure, the system for generating tactile stimulation may further include a display device configured to detect the position of the finger and visually display the virtual model.

To achieve the object, a method for generating tactile stimulation according to still another embodiment of the present disclosure includes generating a virtual model in virtual space, matching position information of the virtual space with position information of a finger, processing the position information of the finger into sensing information corresponding to the virtual space based on a matching relationship, generating a localized geometry observer which is a grid structure on a plane facing a direction in which the finger comes into contact with the virtual model based on the sensing information, calculating a gradient of a surface of the virtual model coincident with the finger based on the sensing information to the localized geometry observer, generating stimulation information including intensity and duration of vibration in consideration of the gradient of the virtual model surface, and transmitting the stimulation information to the apparatus for generating tactile stimulation.

According to an embodiment of the present disclosure, the localized geometry observer may reduce in a size of cells that constitute the grid when a change in the gradient of the virtual model surface is large, and may increase in the size of cells when the change is small.

According to an embodiment of the present disclosure, the calculating of the gradient may include determining a fit plane composed of contact points at which lines projected from each cell of the localized geometry observer to the virtual model meet the surface of the virtual model, and calculating a gradient of the fit plane to the localized geometry observer.

According to an embodiment of the present disclosure, the duration may be determined by a length of an extension line within the localized geometry observer, extending from a center of the localized geometry observer toward a flow direction of stimulation in consideration of a direction component of the gradient of the virtual model surface and by a motion velocity of the finger, and the intensity may be determined by a weight determined based on a position of stimulation on the extension line from one point and by a height of the virtual model surface.

DETAILED DESCRIPTION

Hereinafter, an apparatus according to an embodiment of the present disclosure will be described with reference to the accompanying drawings.

Figure 1:
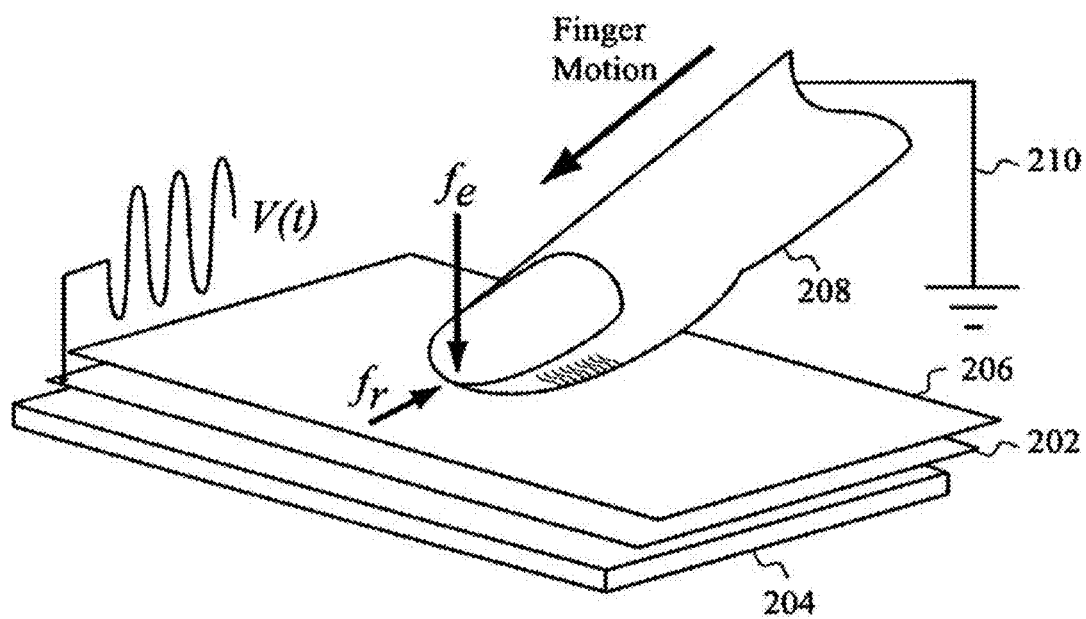
FIG. 1 is a perspective view of a conventional system for generating tactile stimulation.
Figure 2:
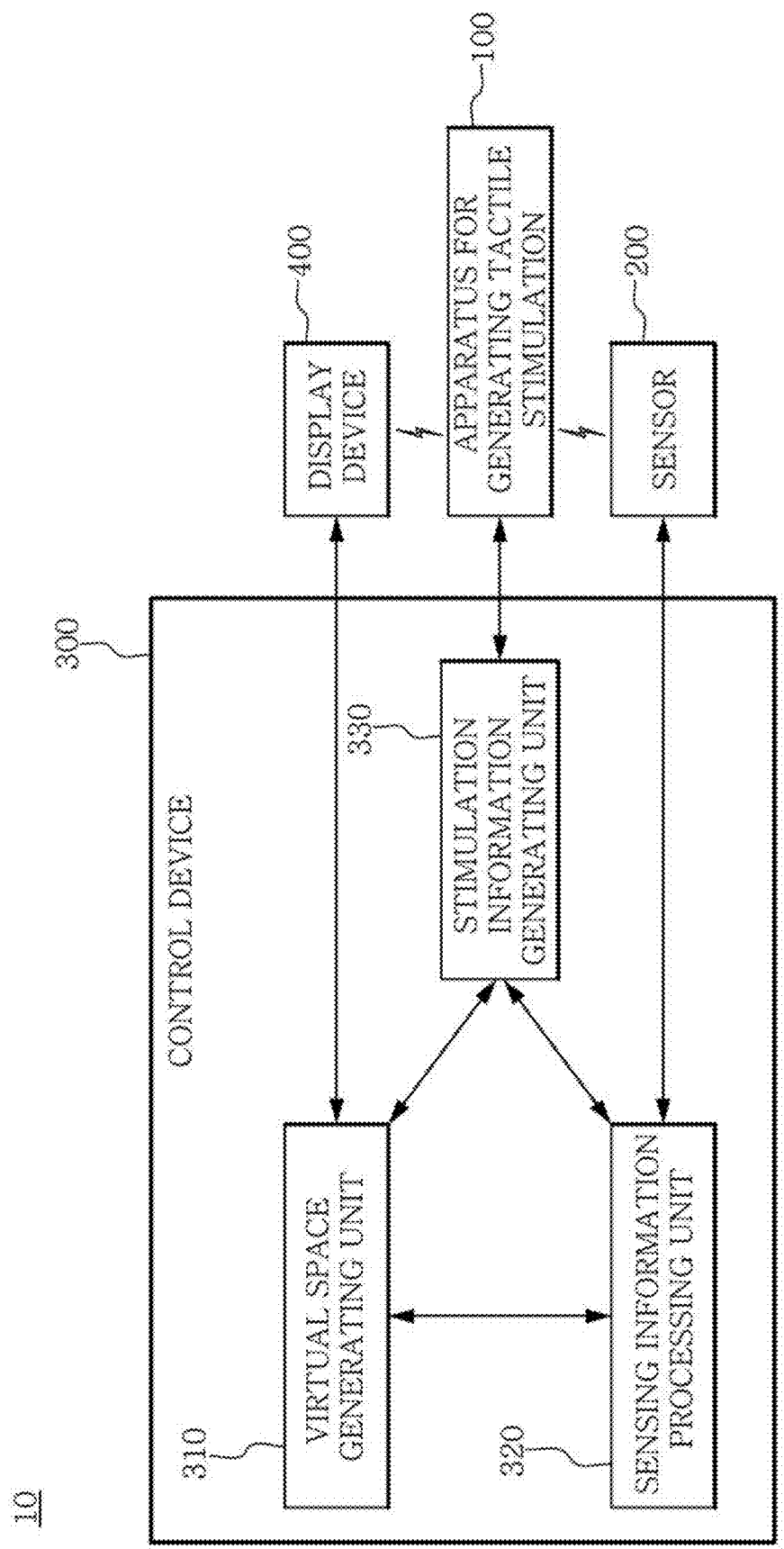
FIG. 2 is a diagram showing the architecture of a system for generating tactile stimulation according to an embodiment of the present disclosure.
Figure 3:
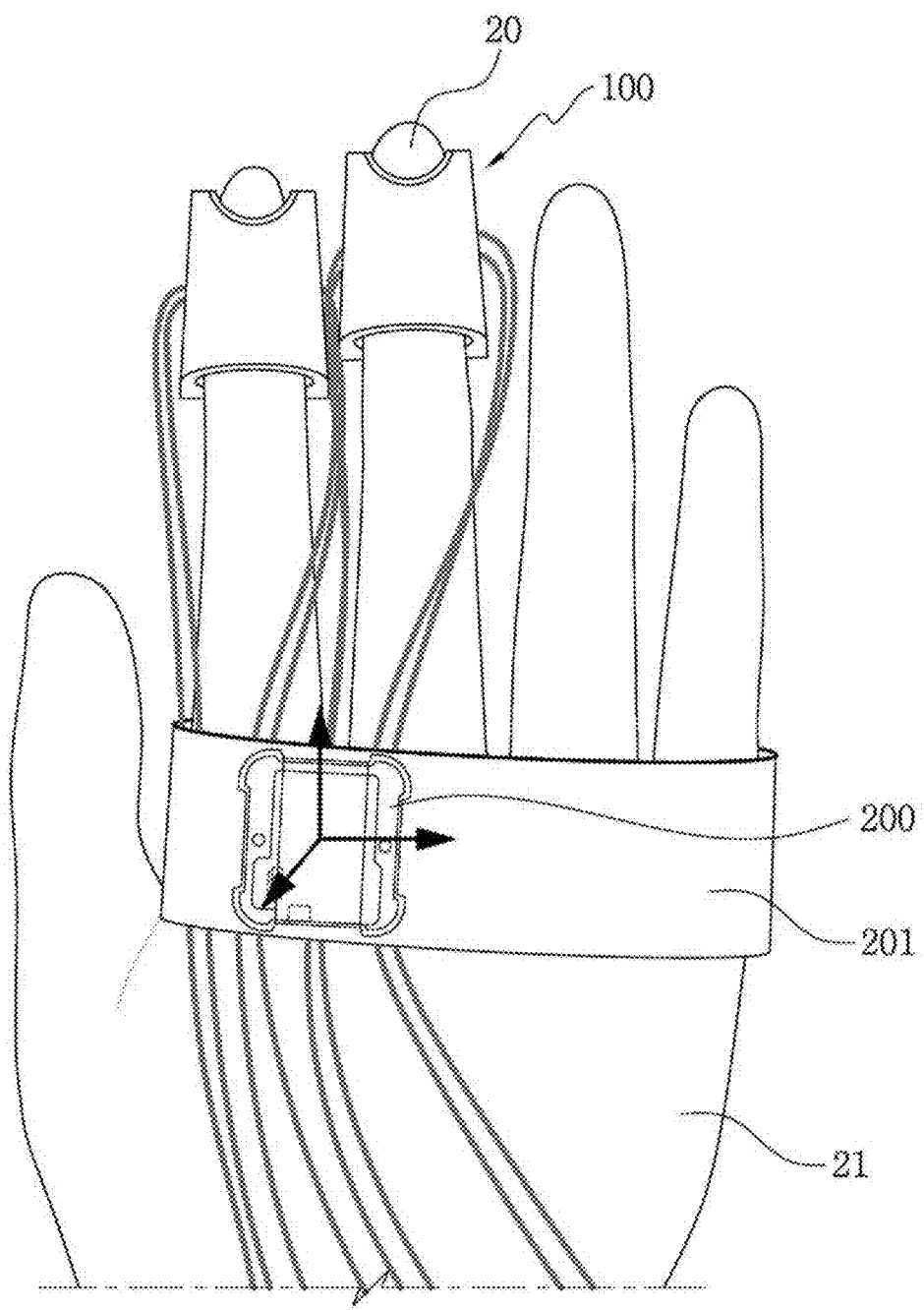
FIG. 3 shows an apparatus for generating tactile stimulation of the system for generating tactile stimulation shown in FIG. 2, worn by a user.
Figure 4:
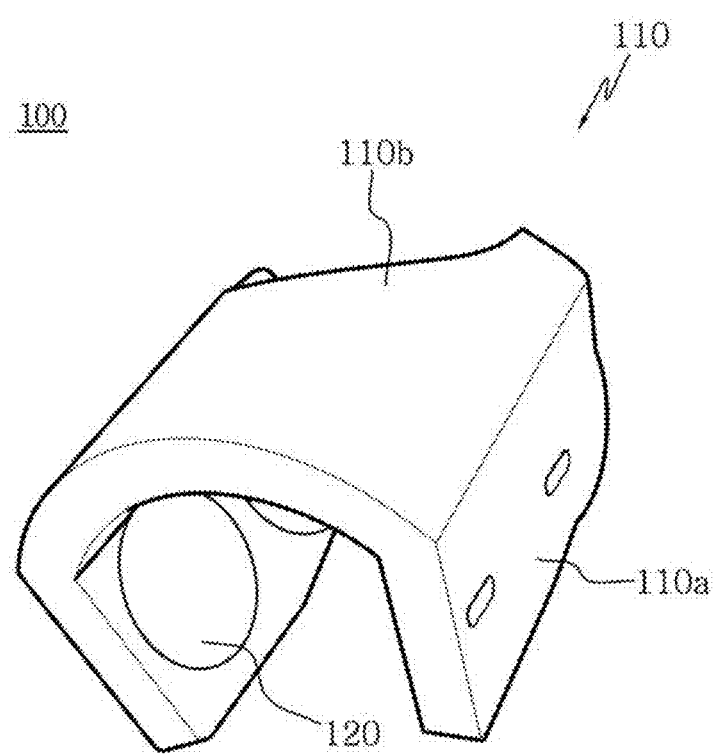
FIG. 4 is an enlarged partial perspective view of a housing and a vibration actuator of the apparatus for generating tactile stimulation shown in FIG. 3.

Referring to FIGS. 2 to 4, a system 10 for generating tactile stimulation according to an embodiment of the present disclosure includes an apparatus 100 for generating tactile stimulation, a sensor 200, a control device 300, and a display device 400.

The apparatus 100 for generating tactile stimulation includes a housing 110 and a vibration actuator 120.

The housing 110 is formed such that it can be worn around a user's finger 20. The housing 110 may be formed in an open shape to one side, for example, a C-shape. The housing 110 is formed in a tapered shape narrowing toward the fingertip so that it can be fixed to the finger more stably.

The housing 110 may include a vibrating unit 110a at which the vibration actuator 120 is placed, and a connecting unit 110b from which each vibrating unit 110a extends.

Each vibrating unit 110a may extend in the inwardly converging direction from the side end of the connecting unit 110b. Thereby, when the housing 110 is worn around the finger 20, the housing 110 can be stably fixed so that it does not easily slip off the finger despite movements of the finger.

The connecting unit 110b is curved such that the finger can be stably situated at a concave portion. Meanwhile, the connecting unit 110b is made of a material having slight elasticity, so that the housing 110 can be stably fixed to the finger even though the thickness of fingers is different from each user.

Meanwhile, in addition to the shape shown in the drawing as described previously, the housing 110 may be formed in various known shapes that can be worn around the finger. Furthermore, the housing 110 may be made of various materials to be stably fixed to the finger. Preferably, the housing 110 is so small and light that the user wears conveniently and avoids visual obstruction as much as possible.

The apparatus 100 for generating tactile stimulation includes multiple vibration actuators 120. The multiple vibration actuators 120 include two vibration actuators 120, each placed on opposing sides of the finger 20. The vibration actuators 120 may be each placed at each connecting unit 110b disposed on opposing sides of the finger 20. Meanwhile, each vibration actuator 120 may be placed on the exactly opposite side at 180 degrees with respect to the finger 20, or may be placed on the opposite side at an obtuse angle with respect to the finger 20.

Four vibration actuators 120 may be paired, forming two pairs, and each pair may be placed on opposing sides of the finger 20. In this instance, the vibration actuators 120 placed on one side may be arranged along the pointing direction of the finger 20.

The vibration actuator 120 may be placed on the inner side of the housing 110. The vibration actuator 120 may be fixed to the inner side surface of the housing 110, while being exposed to the inner space of the housing 110, so that the vibration actuator 120 comes into contact with the finger 20. Meanwhile, the vibration actuator 120 may be embedded in the housing 110 unlike shown.

The vibration actuator 120 may be, for example, a piezoelectric actuator with a 9 mm ceramic disk mounted concentrically on a 12 mm metal disk, available from Murata, Japan. The vibration actuator 120 may be appropriately selected in consideration of the range of vibration intensity required, a response rate required to change the intensity and duration quickly and frequently, and safety such as less heat generated by the application of a sine wave signal.

As described above, each vibration actuator 120 placed around the finger 20 generates vibration with various vibration intensities and durations, allowing the user to sense stimulation from each vibration actuator 120 as one virtual tactile stimulation, i.e., illusory stimulation, not individual stimulation. That is, the illusory stimulation refers to stimulation allowing the user to feel individual vibration generated by the multiple vibration actuators 120 around the finger 20 as one un-split vibration. Meanwhile, it will be easily understood that when only one vibration actuator 120 generates vibration, the user feels real vibration, not illusory stimulation.

Figure 9:
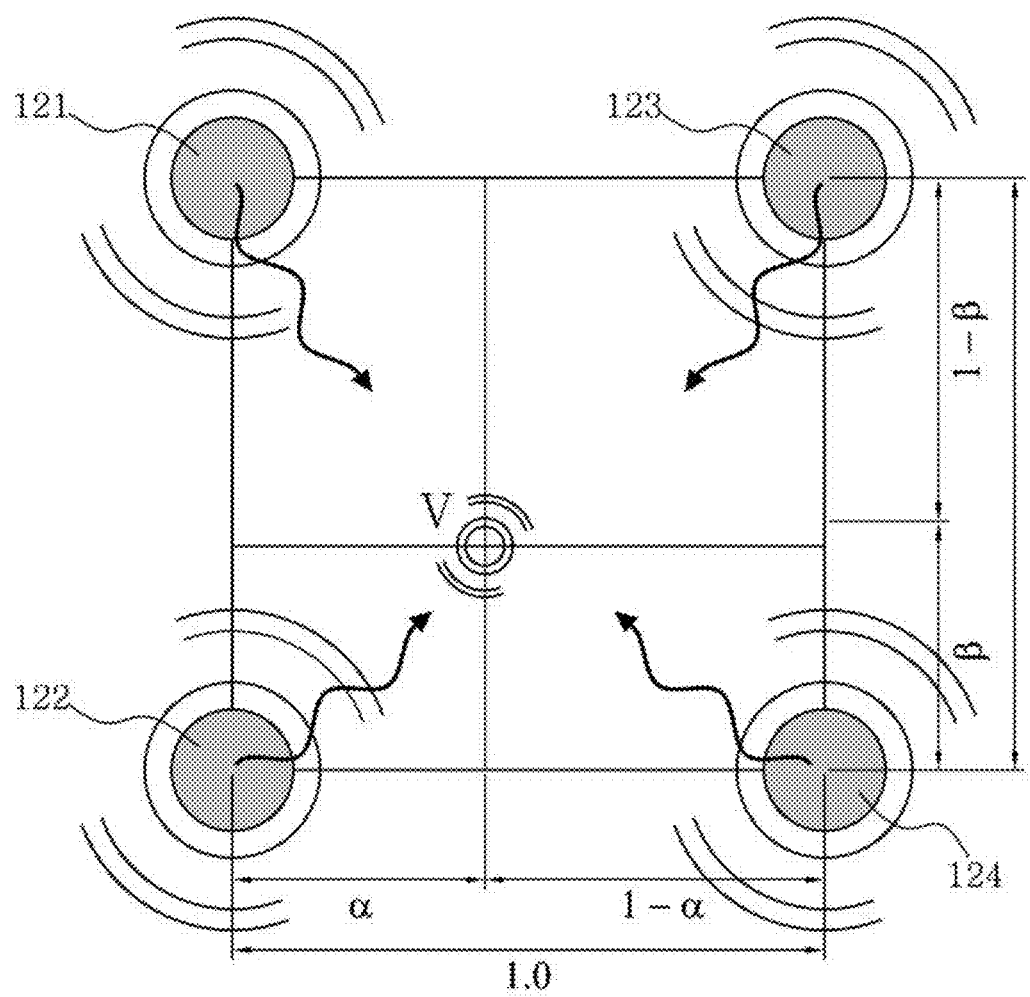
FIG. 9 is a plane view showing illusory stimulation generated by vibration of each actuator.

Referring to FIG. 9, a vibration actuator 121 placed at the front end of one side of the finger, a vibration actuator 122 placed at the rear end of one side of the finger, a vibration actuator 123 placed at the front end of the other side of the finger, and a vibration actuator 124 placed at the rear end of the other side of the finger generate vibration respectively. It can be seen that one illusory stimulation V is created between each vibration actuator 121 to 124, that is, at the inner side of the finger.

Accordingly, not only vibration induced by forces normal to the finger surface is produced but also illusory stimulation V is created within the finger, and stimulation can be generated in various directions.

The apparatus 100 for generating tactile stimulation, described above, may be worn around all or some of the fingers of the user's hands. The apparatuses 100 for generating tactile stimulation worn around multiple fingers may generate stimulation individually for each finger. The apparatuses 100 for generating tactile stimulation worn around each finger can give different tactile effects to each finger.

Furthermore, individual effects can be provided to each finger using multiple contact surfaces, and in the case of single- or multi-contact such as button click, the user can easily distinguish individual stimulation for each finger.

The apparatus 100 for generating tactile stimulation further includes a sensor 200 to detect the position and pointing direction of the finger 20. The sensor 200 may detect information associated with the velocity and acceleration of the finger 20. The direction component of the finger 20 is identified by the sensor 200, thereby changing the direction component of illusory stimulation V.

The sensor 200 to detect the pointing direction of the finger 20 may include an AHRS sensor. The sensor 200 may be fixed to the back 21 of the hand of the user with a sensor fixing band 201 as shown in FIG. 3. It is easy to control when the pointing direction of the finger 20 and the detection direction of the AHRS sensor match with each other.

Meanwhile, the position of the finger 20 may be detected by a touch sensor of the display device 400. Furthermore, although not shown, a RGBD camera may be used to capture images of the user's hand at a separate fixed position to detect the position of the finger 20.

Meanwhile, the sensor 200 may include a wearable sensor as well as the touch sensor on the display device 400 and the RGBD camera, and although the drawing shows that the sensor is placed on the user's hand, it should be understood that the sensor may be placed at various positions where each sensor can detect the position and pointing direction of the finger 20.

The display device 400 provides visual information to the user. The display device 400 may be a 2D display device with a touch screen. Furthermore, the display device 400 may be a 3D display device or a wearable VR device.

The display device 400 may provide the user with the stimulation generated by the apparatus 100 for generating tactile stimulation and visual information of a corresponding virtual structure, such as shape, color and texture. That is, the stimulation generated by the apparatus 100 for generating tactile stimulation may be provided in conjunction with the visual information provided by the display device 400.

A relationship between the visual information displayed on the display device 400 and the position of the finger 20 may be set by the touch sensor of the display device 400 or a separate position sensor, as described above.

For example, stimulation properties to generate for each area of the visual information displayed on the display device 400 may be pre-determined. Furthermore, tactile stimulation may be generated based on the stimulation properties on a display area corresponding to the position of the finger 20 detected by the touch sensor or the position sensor.

The apparatus 100 for generating tactile stimulation may generate tactile stimulation similar to reality to the user. This stimulation may be used to indirectly transmit the shape and texture of a virtual model in virtual space to the user. The control device 300 may generate a virtual space as visual information to be outputted by the display device 400, and process the position information of the finger 20 detected by the sensor 200 into sensing information based on a matching relationship with the space. Furthermore, the control device 300 enables the apparatus 100 for generating tactile stimulation to generate stimulation based on the stimulation properties with a virtual model coincident with the finger.

The control device 300 includes a virtual space generating unit 310, a sensing information processing unit 320, and a stimulation information generating unit 330.

The virtual space generating unit 310 generates a virtual space, and a virtual model disposed in the virtual space. The virtual model may have position information on the coordinate system of the virtual space, and have various shapes and textures. The virtual space may include various virtual models, and each virtual model has position information in the virtual space.

The virtual space generating unit 310 may process the position information of the virtual space and the virtual model in the virtual space into a form that can be outputted, and transmit it to the display device 400 to allow the display device 400 to visually output the virtual space and the virtual model.

The sensing information processing unit 320 receives the position information of the finger 20 of the user detected by the sensor 200, including the position, pointing direction, velocity and acceleration. The sensing information processing unit 320 may individually collect each position information of the finger 20 in the space being detected. Furthermore, the sensing information processing unit 320 may respectively collect the position information of multiple fingers 20.

The sensing information processing unit 320 matches the position information of the virtual space with the position information of the finger 20 detected through the sensor 200. The sensing information processing unit 320 can identify a matching relationship between the position information of the finger 20 and the position information of the virtual space by matching pixels at which each position of the virtual space is outputted on the display device 400 with pixels at which the finger 20 is placed in contact with the touch sensor.

Furthermore, the sensing information processing unit 320 may match the position information of the finger 20 with the position information of the virtual space by finding a conversion relationship between the coordinate system of the real space and the coordinate system of the virtual space using a RGBD camera or the like.

The sensing information processing unit 320 processes the position information of the finger 20 detected by the sensor 200 into sensing information corresponding to the virtual space based on the matching relationship between the virtual space generated by the virtual space generating unit 310 and the position information of the finger 20 of the user.

The sensing information processing unit 320 converts the position, pointing direction, velocity and acceleration of the finger 20 detected by the sensor 200 into sensing information corresponding to the position information of the virtual space. The position information of the finger 20 including the position, pointing direction, velocity and acceleration may be expressed as sensing information including the position, pointing direction, velocity and acceleration in the virtual space, respectively.

Meanwhile, the sensing information of the finger processed by the sensing information processing unit 320 may be transmitted to the virtual space generating unit 310, and represented as a virtual hand model in the virtual space. Furthermore, the generated virtual hand model may be visually outputted by the display device 400.

The stimulation information generating unit 330 compares the sensing information processed by the sensing information processing unit 320 with the position information of the virtual model in the virtual space generated by the virtual space generating unit 310. Accordingly, when the sensing information and the position information coincide, the stimulation information generating unit 330 generates stimulation information including the intensity and duration of stimulation to be generated based on the sensing information and the position information.

Figure 6:
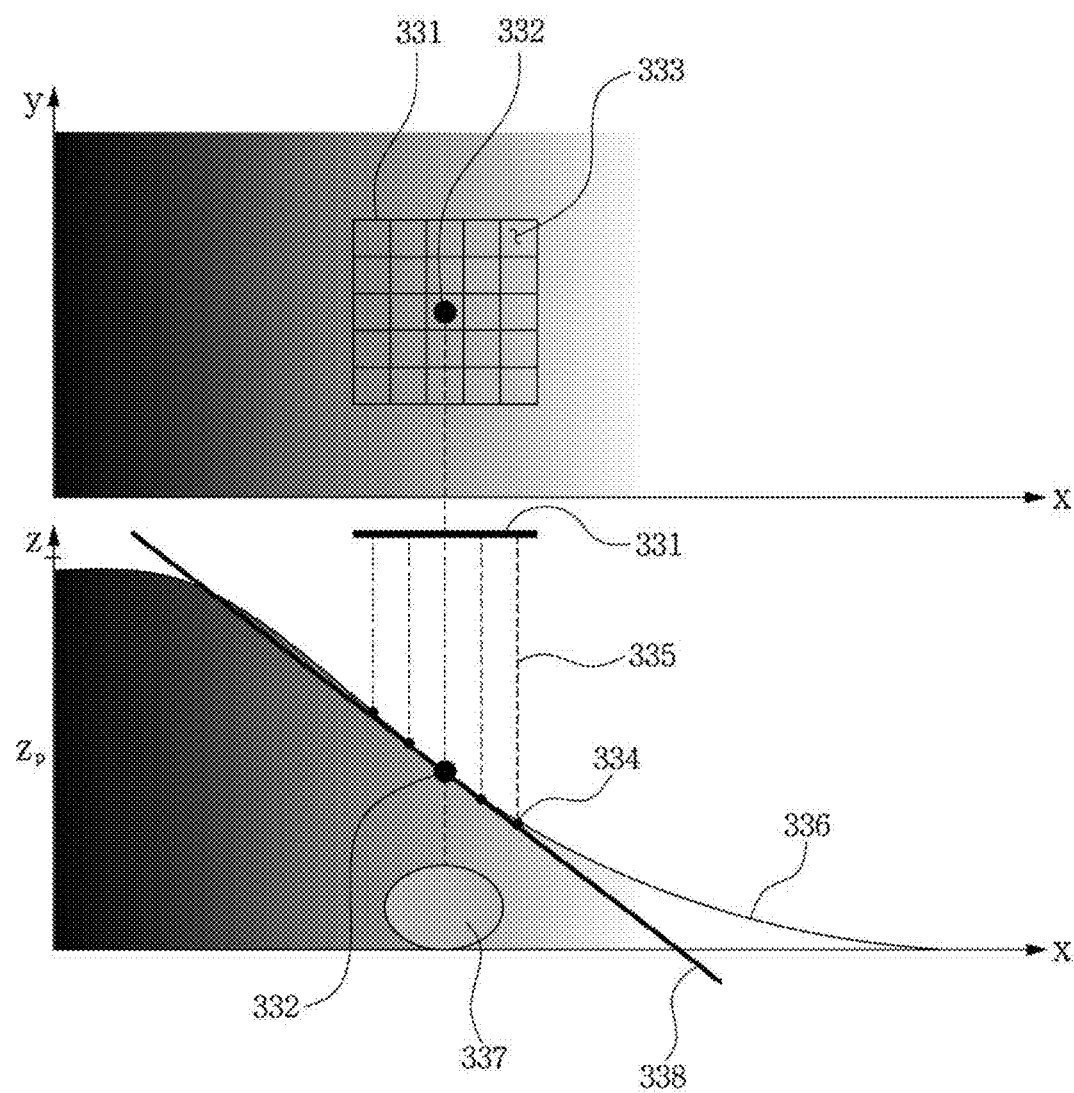
FIG. 6 is a plane view and a side view of a localized geometry observer for observing surface geometry of a virtual model.
Figure 7:
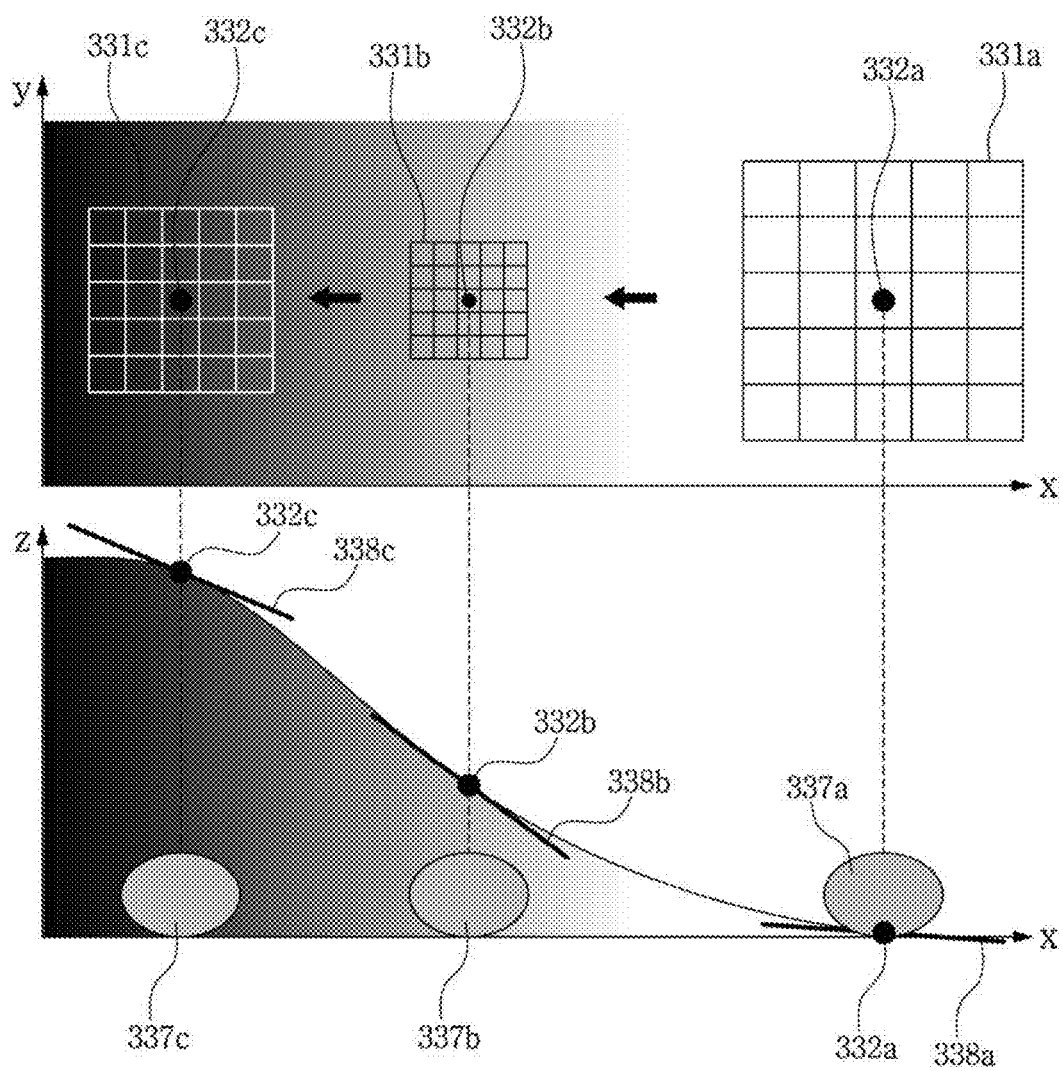
FIG. 7 is a plane view and a side view of a localized geometry observer changing with the movement of a contact point.

Referring to FIGS. 6 and 7, the stimulation information generating unit 330 may identify whether the sensing information and the position information of the virtual model coincide, and set a position at which coincidence occurs as a contact point 332. That is, when the position of the finger 20 processed into sensing information coincides with the position of the virtual model, the position at which the coincidence occurs may be set as the contact point 332.

The stimulation information generating unit 330 may generate a localized geometry observer (LGO) 331 in the virtual space to effectively identify changes in localized geometry of the virtual model with the contact point 332 at the center.

The LGO 331 is a grid structure having cells 333 in a certain size on the plane perpendicular to the contact direction of the finger with the virtual model. The LGO 331 may appropriately change the grid size and the cell size. For example, the LGO 331 may be a 5×5 grid as shown. The LGO 331 is generated above the contact point 332, and is continuously updated as the contact point 332 changes.

The stimulation information generating unit 330 detects collision between the finger and the virtual model, and observes changes in localized geometry using the LGO 331. To detect collision, all the cells 333 of the LGO 331 project lines 335 down to a surface 336 of the virtual model. Then, points at which the projected lines 335 meet the surface 336 of the virtual model may be set as the contact point 332.

Sampling adjacent points 334 near the contact point 332 reduces the influence by much smaller structural noise, ensuring stability of stimulation generation. In this instance, as the grid size of the LGO 331 increases, the localized geometry of the virtual model can be identified more accurately, but the computation performance may reduce, so taking this into account, it is desirable to set the LGO 331 in an appropriate size.

The stimulation information generating unit 330 calculates a gradient of localized geometry of the virtual model based on a best fit plane 338 using the LGO 331. The fit plane 338 may be calculated using the contact point 332 and the adjacent points 334. The gradient of localized geometry of the virtual model may be calculated using each direction vector of the LGO 331 and the fit plane 338.

The LGO 331 dynamically responds to the shape of an area with which the finger comes into contact, in the manner of expanding when a change in surface of the virtual model is moderate, and contracting when a change in surface of the virtual model is sharp. For example, when touch occurs on a surface such as sandpaper, the LGO 331 may contract rapidly so that it can sensitively respond to even small changes on the surface of the virtual model. Furthermore, when touch occurs on a moderately sloped or plane surface, the LGO 331 may expand and become insensitive to structural noise so that it responds to only great changes.

Meanwhile, when generating stimulation information based on the sensing information of the multiple fingers, the stimulation information generating unit 330 may generate multiple contact points, and generate and update the LGO 331 for each contact point.

The stimulation information generating unit 330 may generate stimulation information to be transmitted to the apparatus 100 for generating tactile stimulation using the final condition of the LGO 331, the gradient of the virtual model calculated using the LGO 331, and the sensing information of the finger 20 including the velocity, acceleration and pointing direction. A process for generating stimulation information will be described in detail below.

The stimulation information generating unit 330 transmits the generated stimulation information to the apparatus 100 for generating tactile stimulation to enable the apparatus 100 for generating tactile stimulation to generate tactile stimulation based on the stimulation information. The stimulation information generated by the stimulation information generating unit 330 is preferably transmitted to the vibration actuator 120 as a signal amplified through an amplifier (not shown).

Hereinafter, a method for generating tactile stimulation according to another embodiment of the present disclosure using the system 10 for generating tactile stimulation will be described.

Figure 5:
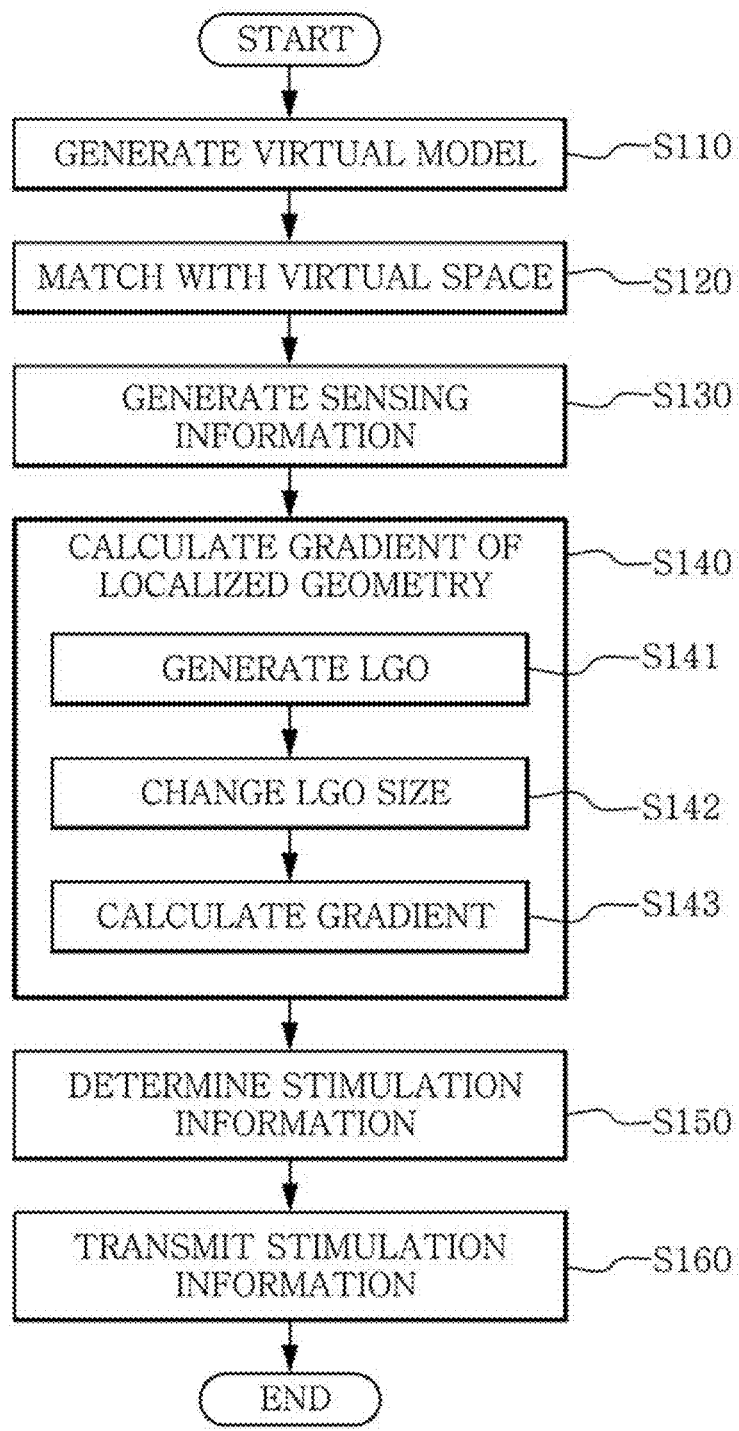
FIG. 5 is a flowchart showing each step of a method for generating tactile stimulation according to another embodiment of the present disclosure.

Referring to FIG. 5, the method for generating tactile stimulation includes generating a virtual space (S110), matching position information of the virtual space with position information of the finger 20 (S120), processing the position information of the finger 20 into sensing information based on a matching relationship (S130), calculating a gradient of localized surface of a virtual model using the LGO (S140), determining stimulation information (S150), and transmitting the stimulation information (S160).

First, a virtual space and a virtual model disposed in the virtual space are generated (S110). Position information of the virtual model may be set based on the coordinate system of the virtual space.

The virtual space and the virtual model generated at S110 are processed into a form that can be outputted, to allow the display device 400 to visually output it.

Subsequently, matching of the position information of the finger 20 detected through the sensor 200 with the position information of the virtual space is performed (S120). Thereby, the presence or absence of contact between the finger in real space and the virtual model in virtual space and a contact position can be identified.

The matching of the position information of the finger 20 may be accomplished by matching pixels at which each position of the virtual space is outputted on the display device 400 with pixels at which the finger 20 is placed in contact with the touch sensor. Furthermore, matching of the position information of the finger 20 with the position information of the virtual space may be performed by finding a conversion relationship between the coordinate system of the real space and the coordinate system of the virtual space using the RGBD camera or the like. The matching between the virtual space and the real space may freely employ various known matching methods.

Subsequently, the position information of the finger 20 detected by the sensor 200 is processed into sensing information corresponding to the virtual space based on a matching relationship between the position information of the virtual space and the position information of the finger 20 (S130).

The position, pointing direction, velocity and acceleration of the finger 20 detected by the sensor 200 is converted into sensing information corresponding to the position information of the virtual space. That is, the position information of the finger 20 including the position, pointing direction, velocity and acceleration may be respectively expressed as sensing information including the position, pointing direction, velocity and acceleration in the virtual space. The sensing information of the finger may be represented as a virtual hand model in the virtual space, and may be visually outputted by the display device 400.

Subsequently, referring to FIGS. 6 and 7, a gradient of localized surface of the virtual model is calculated using the LGO (S140).

First, a contact point 332 is set at the position at which the sensing information of the finger and the position information of the virtual model coincide, and a LGO 331 is generated with the contact point 332 at the center (S141).

When a finger 337 is close to the virtual model, the LGO 331 is temporarily generated above the virtual model surface. In this instance, it is desirable to determine an appropriate grid size of the LGO in consideration of accuracy and computation performance in identifying the localized geometry of the virtual model. Meanwhile, it should be noted that the finger 337 depicted in the drawing shows a horizontal position based on the corresponding sensing information of the finger in virtual space, for convenience of description and understanding.

Subsequently, lines 335 are projected from all cells 333 of the LGO 331 down to the surface 336 of the virtual model to detect whether the finger and the virtual model coincide. When the finger and the virtual model coincide, a best fit plane 338 is determined through the contact point 332 corresponding to the line 335 projected from the center cell of the LGO 331 and its adjacent contact points 334.

Subsequently, as the finger moves, the size of the LGO 331 generated at S140 is changed in consideration of changes in localized geometry of the virtual model coincident with the finger (S142).

With the changes in gradient of localized surface of the virtual model, the cell size of the LGO 331 may be expanded or changed within the range between minimum and maximum values of a pre-determined expansion/contraction parameter. FIG. 7 shows that a LGO 331a and a fit plane 338a are determined based on a contact point 332a set at a finger 337a in low position, and as the finger 337b, 337c moves gradually, the corresponding contact point 332b, 332c, LGO 331b, 331c and fit plane 338b, 338c change.

If the gradient of localized surface of the coincident virtual model becomes flat or changes very gradually as the finger 337a, 337c moves, the cell size of the LGO 331a, 331c is increased to expand the LGO 331a, 331c. In contrast, if the localized surface of the coincident virtual model changes frequently or sharply as the finger 337b moves, the cell size of the LGO 331b is reduced to contract the LGO 331b, so that changes in localized surface can be detected quickly. The expansion or contraction of the LGO 331 repeats until the minimum or maximum value of the pre-determined expansion/contraction parameter is reached, thereby determining when to stop the expansion and contraction.

In relation to how accurately the localized geometry is identified by the LGO 331, it is important to appropriately select the minimum and maximum values of the pre-determined parameter. The parameter may be determined empirically based on the shape of the virtual model and the user preferences. For example, when the minimum value is too small, the LGO 331 is continuously kept small and a signal generated is too small, allowing the user to feel disruptive feedback. On the contrary, when the maximum value is too large, the LGO 331 becomes excessively large and provides blurred feedback. In this case, a small but significant localized geometry of the virtual model may be disregarded.

Using each direction vector of the LGO 331 and the fit plane 338 finally determined, a gradient of localized geometry of the virtual model under the contact point is calculated (S143).

Subsequently, the intensity and duration of illusory stimulation V are determined as stimulation information based on the gradient of localized geometry of the virtual model and the motion properties of the finger (S150).

First, when the gradient of localized surface of the virtual model is determined by the LGO 331 at S143, 2D direction vector d may be determined as in Equation 1 below.

$$\vec{d} = -\left(\frac{\partial z}{\partial x}\right)\vec{u}_x - \left(\frac{\partial z}{\partial y}\right)\vec{u}_y \qquad \text{[Equation 1]}$$

Figure 8:
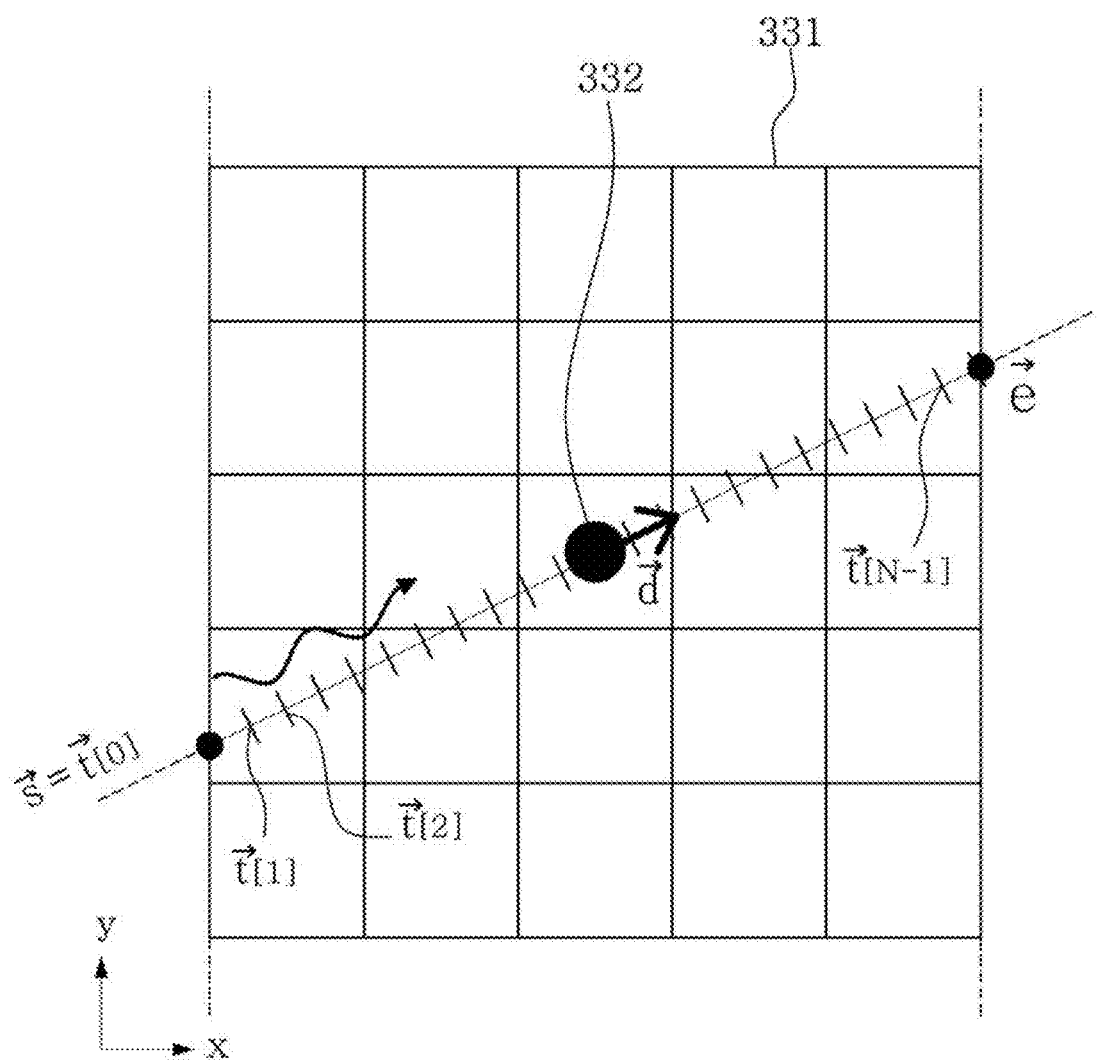
FIG. 8 is a plane view showing start and end points of a stimulation flow within a localized geometry observer.

Vectors $u_x$ and $u_y$ are unit vectors in x axis and y axis respectively. Negative coefficients of vector d represent a direction of stimulation flow with the movement of the finger from a higher position to a lower position. In this instance, a line trajectory along which the flow of stimulation follows is required. Accordingly, line segmentation intersection testing is conducted between a line extending along the direction vector d from the center contact point and a boundary line of the LGO as shown in FIG. 8. From the testing, start point vector s and end point vector e of the stimulation flow are determined.

Meanwhile, to transmit appropriate illusory stimulation, an actuation signal needs to be appropriately modulated. The essentials of signal modulation are established on tactile apparent motion, and this is an illusory phenomenon that is perceived in such a way that two adjacent tactile stimulations are caused by a single actuator continuously moving therebetween.

Such illusion effects may be generated by adjustment of a time interval between sequential actuation signals of the vibration actuators, or signal onset asynchrony (SOA) between signals, and stimulation duration. For optimized selection of SOA, Equation 2 below may be used.

$$SOA = 0.32 \times d + 0.0473 \geq d \qquad \text{[Equation 2]}$$

Through Equation 2, the duration constraint d<0.0698s may be obtained. With the constraint, overlaps in successive illusory stimulation can be prevented.

The trajectory length L is determined by the end point vector e and the start point vector s, and the duration T of illusory stimulation is determined by the motion velocity vector v and the trajectory length L of the finger as in Equation 3 below.

$$T = \frac{L}{\|\vec{v}\|} \text{ where } L = \|\vec{e} - \vec{s}\| \quad \text{[Equation 3]}$$

Meanwhile, with the constraint on the duration defined in Equation 2, the number of sampling for the duration T may be calculated by Equation 4 below.

$$N = \left\lfloor \frac{T}{0.0698} \right\rfloor \quad \text{[Equation 4]}$$

Using this, vector t segmented to create a stimulation flow along the trajectory may be calculated as in Equation 5 below.

$$\vec{t}[k] = \vec{s} + k(L/N)\vec{u}_d \quad \text{[Equation 5]}$$

In Equation 5, 0<k<N−1, and vector $u_d$ is a unit vector of direction vector d.

The intensity of vibration of the vibration actuator is proportional to a maximum intensity $A_{max}$ of vibration that can be generated by the vibration actuator, a normalized height $\hat{z}$ to the range between 0.0 and 1.0, and a weight for producing decentralized output to generate apparent illusory stimulation.

With regard to the weight, FIG. 9 shows a method for determining the position of illusory stimulation V generated by a combination of vibration of four vibration actuators 121 to 124. The position of illusory stimulation V from vibration generated by each vibration actuator may be determined by α and β.

First, from Equation 5, for the duration T, a series of (α, β) values for all positions of illusory stimulation V may be obtained. Subsequently, the intensity of vibration of four vibration actuators 121 to 124 may be determined as in Equation 6.

$$\begin{cases} A_{LB} = \hat{z}_{LB} A_{max} \cdot (1-\alpha)(1-\beta) \\ A_{RB} = \hat{z}_{RB} A_{max} \cdot \alpha(1-\beta) \\ A_{RT} = \hat{z}_{RT} A_{max} \cdot \alpha\beta \\ A_{LT} = \hat{z}_{LT} A_{max} \cdot (1-\alpha)\beta \end{cases} \quad \text{[Equation 6]}$$

In Equation 6, LB denotes the bottom left vibration actuator, RB denotes the bottom right vibration actuator, LT denotes the top left vibration actuator, and RT denotes the top right vibration actuator. By simple proportional representation, the intensity Av of illusory stimulation V is determined as in Equation 7 below.

$$A_V = A_{LB} \cdot (1-\alpha)(1-\beta) + A_{RB} \cdot \alpha(1-3) + A_{RT} \cdot \alpha\beta + A_{LT} \cdot (1-\alpha)\beta \quad \text{[Equation 7]}$$

In some exceptional cases, first, a plane surface where the height of localized geometry of the virtual model is not 0 may generate disruptive stimulation for a long term, but in this case, the problem can be solved by providing illusory stimulation V with the intensity of 0.

Next, when the motion velocity of the finger is very slow, the duration T converges to infinity, resulting in excessively large sampling size, which causes the performance to reduce. On the contrary, when the motion velocity of the finger is too fast, the duration T is too short, failing to generate significant illusory stimulation. To prevent this problem, the magnitude of the velocity vector v of the finger may be adjusted based on maximum and minimum values the user prefers, as in Equation 8 below.

$$\|\vec{v}\| = \begin{cases} 0 & \text{if } \|\vec{v}\| \leq \|\vec{v}\|_{min} \\ \|\vec{v}\|_{max} & \text{if } \|\vec{v}\| \geq \|\vec{v}\|_{max} \end{cases} \quad \text{[Equation 8]}$$

Finally, the stimulation information generated at S150 is transmitted to the apparatus 100 for generating tactile stimulation (S160).

According to the present disclosure described in the foregoing, tactile stimulation is provided to the user based on the surface structure and texture of the virtual model using the apparatus 100 for generating tactile stimulation composed of the multiple vibration actuators 121 to 124 around the finger 20 of the user, together with visual information provided by the display device 400. The apparatus 100 for generating tactile stimulation can represent 2.5D elements based on the surface texture or height of a virtual object that the user is touching, by effectively arranging and driving the vibration actuators 121 to 124 with no stimulating element to provide forces in the normal direction. The present disclosure can be used in VR/AR, 4D entertainment systems, games, compact/pocket interfaces, wearable devices, and related studies.

DETAILED DESCRIPTION OF MAIN ELEMENTS

100: Apparatus for generating tactile stimulation
110: Housing
110a: Vibrating unit
110b: Connecting unit
120, 121, 122, 123, 124: Vibration actuator
200: Sensor
201: Sensor fixing band
300: Control device
310: Virtual space generating unit
320: Sensing information processing unit
330: Stimulation information generating unit
400: Display device

What is claimed is:

1. An apparatus for generating tactile stimulation comprising:
at least one housing configured to be worn around a user's finger, the at least one housing including a pair of vibration actuators disposed on opposing sides of a surface of the housing; and
a sensor fixing band including a sensor configured to detect a position and a pointing direction of the finger, wherein the sensor fixing band is configured to be worn around a hand of the user,
wherein the vibration actuators apply vibration to the finger with intensity and duration determined by the position and the pointing direction of the finger detected by the sensor, and
wherein illusory stimulation is generated within the finger by the vibration generated by the vibration actuators, the illusory stimulation being configured to allow the user to feel individual vibration generated by the pair of vibration actuators around the finger as one un-split vibration.

2. The apparatus for generating tactile stimulation according to claim 1, wherein the pair of vibration actuators are configured to be placed on each of two sides of the finger, and wherein the pair of vibration actuators placed on each side of the finger are arranged along the pointing direction of the finger.

3. A system for generating tactile stimulation comprising:
the apparatus for generating tactile stimulation according to claim 1; and
a control device configured to generate a virtual model in virtual space, determine intensity and duration of vibration based on geometry of the virtual model corresponding to a pointing direction and a position of a finger detected by the sensor, and operate the vibration actuators to generate vibration with the determined intensity and duration.

4. The system for generating tactile stimulation according to claim 3, further comprising:
a display device configured to detect the position of the finger and visually display the virtual model.

5. The apparatus for generating tactile stimulation according to claim 1, wherein the housing includes a connecting unit connecting the vibration actuators to one another, and
wherein the housing is open at a side opposite to the connecting unit.

6. The apparatus for generating tactile stimulation according to claim 1, wherein the housing has a tapered shape narrowing towards a fingertip of the finger.

7. A method for generating tactile stimulation comprising:
providing the apparatus for generating tactile stimulation according to claim 1;
installing the apparatus for generating tactile stimulation onto a hand of a user;
generating a virtual model in virtual space;
matching position information of the virtual space with position information of a finger of the user;
processing the position information of the finger into sensing information corresponding to the virtual space based on a matching relationship;
generating a localized geometry observer which is a grid structure on a plane facing a direction in which the finger comes into contact with the virtual model based on the sensing information;

calculating a gradient of a surface of the virtual model coincident with the finger based on the sensing information to the localized geometry observer;
generating stimulation information including intensity and duration of vibration in consideration of the gradient of the virtual model surface;
transmitting the stimulation information to the apparatus for generating tactile stimulation, and
generating tactile stimulation at the apparatus for generating tactile stimulation based on the stimulation information.

8. The method for generating tactile stimulation according to claim 7, wherein the localized geometry observer reduces in a size of cells that constitute the grid when a change in the gradient of the virtual model surface is large, and increases in the size of the cells when the change is small.

9. The method for generating tactile stimulation according to claim 7, wherein the calculating of the gradient comprises:
determining a fit plane composed of contact points at which lines projected from each cell of the localized geometry observer to the virtual model meet the surface of the virtual model; and
calculating a gradient of the fit plane to the localized geometry observer.

10. The method for generating tactile stimulation according to claim 7, wherein the duration is determined by a length of an extension line within the localized geometry observer, extending from a center of the localized geometry observer toward a flow direction of stimulation in consideration of a direction component of the gradient of the virtual model surface, and by a motion velocity of the finger, and
wherein the intensity is determined by a weight determined based on a position of stimulation on the extension line from one point, and by a height of the virtual model surface.

* * * * *